United States Patent [19]
Shigeno

[11] Patent Number: 6,147,727
[45] Date of Patent: Nov. 14, 2000

[54] REFLECTION TYPE LIQUID CRYSTAL DISPLAY DEVICE

[75] Inventor: Nobuyuki Shigeno, Kanagawa, Japan

[73] Assignee: Sony Corporation, Tokyo, Japan

[21] Appl. No.: 09/289,545

[22] Filed: Apr. 12, 1999

[30] Foreign Application Priority Data

Apr. 20, 1998 [JP] Japan .................................. 10-125285

[51] Int. Cl.$^7$ ................................................ G02F 1/1335
[52] U.S. Cl. ............................ 349/99; 349/117; 349/121; 349/113
[58] Field of Search ............................. 349/99, 113, 121, 349/117

[56] References Cited

U.S. PATENT DOCUMENTS

Re. 35,799   5/1998   Sonehara et al. .......................... 349/99
6,078,370   6/2000   Wang et al. ............................... 349/75

*Primary Examiner*—James A. Dudek
*Attorney, Agent, or Firm*—Hill & Simpson

[57] ABSTRACT

A reflection type liquid crystal display device including a panel, a polarizing plate, and a ¼ wavelength plate, with the polarizing plate and the ¼ wavelength plate being placed upon the panel. The panel includes a transparent first substrate disposed at the external light incoming side; a second substrate opposing the first substrate, with the first substrate and the second substrate being put together so as to be separated by a predetermined distance; nematic liquid crystals kept in the gap between the substrates, with the molecules thereof having a twisted orientation; and an electrode, formed at both of the substrates, for applying a voltage to the nematic liquid crystals. When a voltage is not applied, the orientation of the molecules of the nematic liquid crystals is maintained, so that the nematic liquid crystals act together as a ¼ wavelength layer. Therefore, the nematic liquid crystals cooperate with the polarizing plate and the ¼ wavelength plate in order to pass external light and produce a white display. On the other hand, when a voltage is applied, the orientation of the molecules of the nematic liquid crystals is changed to a substantially vertical orientation, so that the nematic liquid crystals lose their ability to act together as a ¼ wavelength layer.

3 Claims, 4 Drawing Sheets

REFLECTION TYPE LIQUID CRYSTAL DISPLAY DEVICE

RELATED APPLICATION DATA

The present application claims priority to Japanese Application No. P10-125285 filed Apr. 20, 1998 which application is incorporated herein by reference to the extent permitted by law.

BACKGROUND OF THE INVENTION

1. Field of the Invention

The present invention relates to a reflection type liquid crystal display device for displaying information or images by making use of external light such as illuminating light generated from an indoor illuminating lamp or natural light coming into a room from a window. More particularly, the present invention relates to a technique for increasing contrast of a reflection type liquid crystal display device.

2. Description of the Related Art

Normally white mode, TN-ECB, reflection type liquid crystal display devices are known. An example of such reflection type liquid crystal display devices is disclosed in, for example, Japanese Unexamined Patent Publication No. 4-116515. As illustrated in FIG. 5, a conventional TN-ECB, normally white mode, reflection type liquid crystal display device comprises a panel 0, a ¼ wavelength plate 8, and a polarizing plate 70. The panel 0 comprises a transparent first substrate 1 disposed at the external light incoming side; a second substrate 2 opposing the first substrate 1, with the first substrate 1 and the second substrate 2 being put together so as to be separated by a predetermined distance; nematic liquid crystals 3 kept in the gap between both of the substrates, with the molecules thereof having a twisted orientation; and electrodes 7 and 10 for applying voltage to the nematic liquid crystals 3 at the first substrate 1 side and the nematic liquid crystals 3 at the second substrate 2 side. The electrode 7 formed at the first substrate 1 at the light-incoming side is transparent, while the electrode 10 formed at the second substrate 2 at the reflection side is capable of reflecting light. The polarizing plate 70 is disposed at the light-incoming side of the panel 0, with the ¼ wavelength plate 8 being disposed between the polarizing plate 70 and the panel 0. When a voltage is not applied, the twisted orientation of the molecules of the nematic liquid crystals 3 is maintained, so that the nematic liquid crystals 3 act together as a ¼ wavelength layer. Therefore, the nematic liquid crystals 3 cooperate with the polarizing plate 70 and the ¼ wavelength plate 8 in order to pass external light and produce a white display. This is called normally white mode. When a voltage is applied, the orientation of the molecules of the nematic liquid crystals 3 changes to a substantially vertical orientation, so that the nematic liquid crystals 3 lose their ability to act together as a ¼ wavelength layer. Therefore, the nematic liquid crystals 3 cooperate with the polarizing plate 70 and the ¼ wavelength plate 8 in order to block external light in order to produce a black display.

FIG. 6 is a plan view schematically illustrating the optical arrangement of component parts of the reflection type liquid crystal display device of FIG. 5. In FIG. 6, the transmission axis of the polarizing plate 70 is designated 70P; the high refractive index orientation (optical anisotropic axis) of the ¼ wavelength plate 8 is designated 8S; and the director (molecular major axis direction) of the liquid crystal molecules 4 at the first substrate 1 side is designated 4D. As is clear from FIG. 6, in the conventional reflection type liquid crystal display device, the optical anisotropic axis 8S of the ¼ wavelength plate 8 is set at an angle of 45 degrees from the transmission axis 70P of the polarizing plate 70. Therefore, the linearly polarized light beams which pass through the polarizing plate 70 are converted into circularly polarized light beams by the ¼ wavelength plate 8. The optical anisotropic axis 8S of the ¼ wavelength plate 8 is perpendicular to the director 4D of the liquid crystal molecules 4 at the first substrate 1 side (or to the optical main axis of the nematic liquid crystals 3). When the optical main axis of the nematic liquid crystals 3 and the optical anisotropic axis 8S of the ¼ wavelength plate (phase plate) 8 are set perpendicular to each other, the phase lead and the phase lag, which depend on the wavelength of the incident light, are cancelled, so that spectrum compensation of the reflected light is achieved. In other words, the optical relationship illustrated in FIG. 6 results in the most efficient polarization conversion in the panel 0, thereby increasing the white display reflectivity.

The conditions illustrated in FIG. 6 are set on the assumption that a simple ¼ wavelength plate with retardations that become smaller with longer wavelengths is used. In addition, the aforementioned conditions are set only from the viewpoint of increasing white display reflectivity. However, ¼ wavelength plates which are actually used are of the wide band type having substantially flat optical characteristics in the visible wavelength range. In general, the wide band type ¼ wavelength plates have wavelength distribution characteristics with a slight peak in the green wavelength region and small retardations in the blue wavelength and green wavelength regions. Therefore, when a wide band ¼ wavelength plate is used, the conditions of FIG. 6 are not necessarily appropriate. In addition, even when a n electrical field is applied and a black display is produced, the molecules of the nematic liquid crystals 3 do not actually stand up completely, so that there is still retardation. Therefore, a certain amount of light leaks when a black display is generated. Consequently, even when the liquid crystal display device is produced under conditions resulting in high white display reflectivity, the contrast (that is, the ratio between the white display reflectivity and the black display reflectivity) becomes very low, unless the black display reflectivity is made sufficiently low.

SUMMARY OF THE INVENTION

To overcome the above-described problems, according to the present invention, there is provided a reflection type liquid crystal display device, comprising:

a panel comprising a transparent first substrate disposed at an external light incoming side; a second substrate opposing the first substrate, with the first substrate and the second substrate being put together so as to be separated by a predetermined distance; nematic liquid crystal kept in the gap, with the molecules thereof having a twisted orientation; and an electrode, formed at the first substrate and at the second substrate, for applying a voltage to the nematic liquid crystal;

a polarizing plate disposed at the first substrate side; and a ¼ wavelength plate disposed at the first substrate side;

wherein when a voltage is applied, the orientation of the molecules of the nematic liquid crystal is changed to a substantially vertical orientation, and the nematic liquid crystal loses the ability to act as a ¼ wavelength layer, so that the nematic liquid crystal cooperates with the polarizing plate and the ¼ wavelength plate for blocking external light in order to generate a black display; and wherein the direction of a transmission axis of the polarizing plate is set at an angle of from 120 to 150 degrees from the direction of orientation of the portion of the nematic liquid crystal disposed at the first substrate side.

Although not exclusive, the ¼ wavelength plate may be a laminated structure of at least two phase films with different stretch axial directions, the ¼ wavelength plate having substantially flat optical characteristics in the visible wavelength region.

Although not exclusive, the direction of orientation of the portion of the nematic liquid crystal at the second substrate side may be separated from the direction of orientation of the portion of the nematic liquid crystal at the first substrate side by an angle of from 60 to 70 degrees.

According to the reflection type liquid crystal display device of the present invention, when a voltage is not applied, the twisted orientation of the molecules of the nematic liquid crystals is maintained, so that the nematic liquid crystals act together as a ¼ wavelength layer, whereas when a voltage is applied, the orientation of the molecules of the nematic liquid crystals is changed to a vertical orientation, so that the nematic liquid crystals lose their ability to act together as a ¼ wavelength layer. In other words, the reflection type liquid crystal display device of the present invention is of the TN-ECB mode type. When a voltage is not applied, the nematic liquid crystals cooperate with the polarizing plate and the ¼ wavelength plate to allow passage of external light in order to produce a white display, whereas when a voltage is applied, they cooperate with the polarizing plate and the ¼ wavelength plate to block external light in order to produce a black display. This is called normally white mode. In the TN-ECB, normally white mode, reflection type liquid crystal display device, the direction of the transmission axis of the polarizing plate, with the ¼ wavelength plate laminated thereon, is set at an angle of from 120 to 150 degrees from the direction of orientation of the molecules of the nematic liquid crystals at the light-incoming side substrate, so that the black display reflectivity is reduced, making it possible to increase contrast.

DESCRIPTION OF THE PREFERRED EMBODIMENTS

Figure 1:
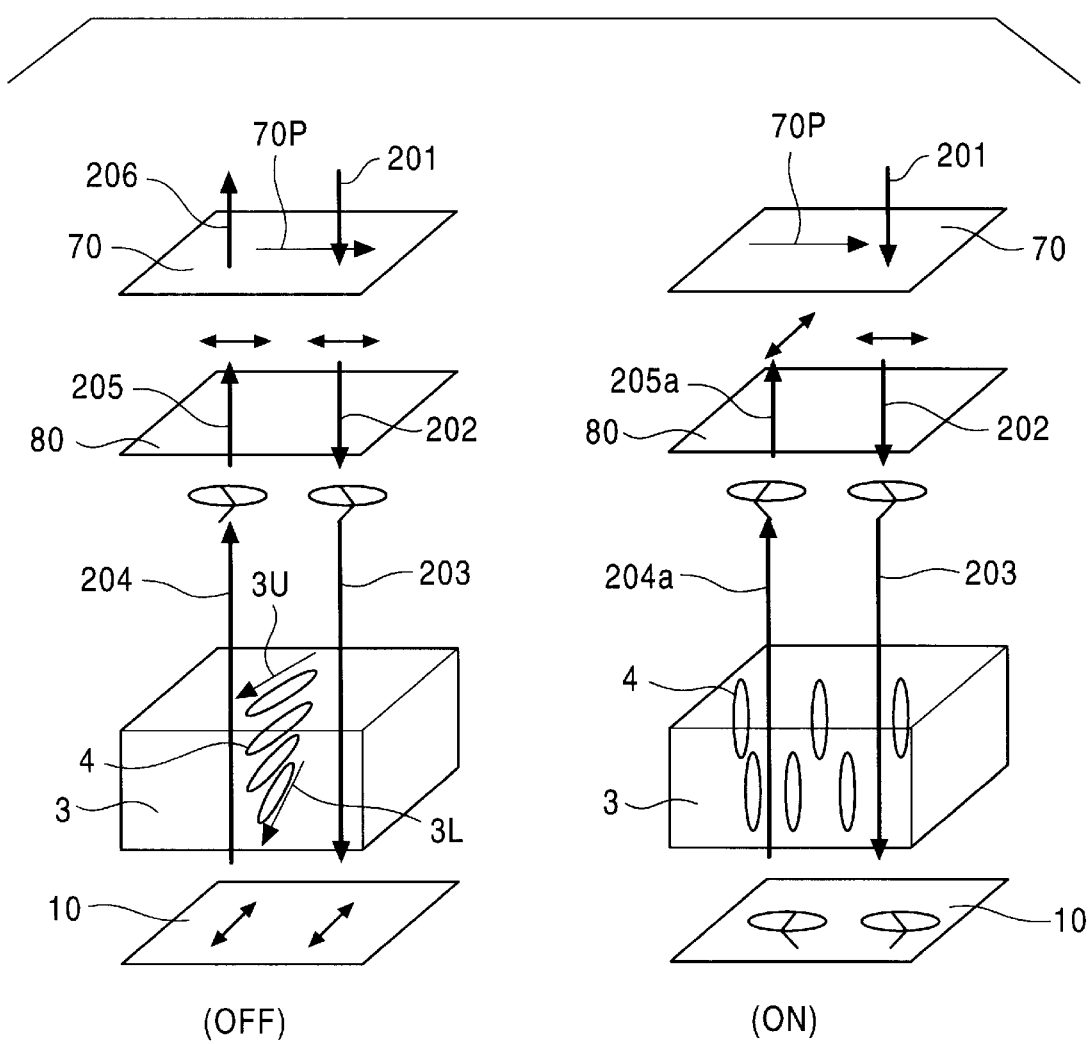
FIG. 1 is a schematic view of the basic structure and the operation of a reflection type liquid crystal display device in accordance with the present invention.

A description will now be given of embodiments of the present invention with reference to the drawings. FIG. 1 is a schematic view illustrating the basic structure and the operation of a reflection type liquid crystal display device in accordance with the present invention. In FIG. 1, when the reflection type liquid crystal display device is in an OFF state, no voltage is being applied thereto, whereas when it is in an ON state, a voltage is being applied thereto. The reflection type liquid crystal display device comprises, from the observer side, a polarizing plate 70, a wavelength plate 80, nematic liquid crystals 3, and a light reflecting layer 10, which are placed upon one another. The polarizing plate 70 is formed of, for example, a high polymer film with an optical anisotropic axis. The light reflecting layer 10 is formed of, for example, iron. It is to be noted that the nematic liquid crystals 3 are sandwiched between a first substrate (not shown) at the light-incoming side and a second substrate (not shown) at the reflection side. The transmission axis of the polarizing plate 70 is represented by arrow 70P. The direction of orientation of nematic liquid crystal molecules 4 at the first substrate side is represented by arrow 3U. In the invention, the transmission axis 70P of the polarizing plate 70 is separated by an angle of from 120 to 150 degrees from the direction of orientation 3U of the nematic liquid crystal molecules 4 at the first substrate side. The direction of orientation of nematic liquid crystal molecules 4 at the second substrate side is represented by the arrow 3L. In the embodiment, the direction of orientation 3L of the nematic liquid crystal molecules 4 at the second substrate side is set at an angle of from 60 to 70 degrees from the direction of orientation 3U of the nematic liquid crystal molecules 4 at the first substrate side. The ¼ wavelength plate 80 is a laminated structure of at least two phase films with different stretch axial directions, and has virtually smooth optical characteristics in the visible wavelength region.

In this construction, when incident light 201 passes through the polarizer 70, it is converted into a linearly polarized light beam 202. The direction of polarization of the linearly polarized light beam 202 is parallel to the transmission axis 70P. The resulting linearly polarized light beam 202 will hereinafter be called parallel linearly polarized light beam. When the parallel linearly polarized light beam 202 passes through the ¼ wavelength plate 80, it is converted into a circularly polarized light beam 203, which passes through the nematic liquid crystals 3, acting together as a ¼ wavelength plate, in order to be converted into a linearly polarized light beam. The direction of polarization of the resulting linearly polarized light beam, after rotation of the direction of polarization of the parallel polarized light beam 202 by 90 degrees, is perpendicular to it. The resulting linearly polarized light beam will hereinafter be called perpendicular linearly polarized light beam. After being reflected by the light reflecting layer 10, the perpendicular linearly polarized light beam 203 passes through the nematic liquid crystals 3, which act together as a ¼ wavelength plate, so that it is converted into a circularly polarized light beam 204. The circularly polarized light beam 204 which passes through the ¼ wavelength plate 80 is converted into a parallel linearly polarized light beam 205, which passes through the polarizing plate 70 and leaves it as outgoing light beam 206. The light beam 206 reaches the observer, so that a white display is produced.

When a voltage is being applied to the liquid crystal display device so that it is in an on state, the twisted orientation of the liquid crystal molecules 4 is changed to a substantially vertical orientation, so that the liquid crystals 3 lose their ability to act together as a ¼ wavelength layer. The external light beam 201 which passes through the polarizing plate 70 is converted into a parallel linearly polarized light beam 202, which passes through the ¼ wavelength plate 80 in order to be converted into a circularly polarized light beam 203. After passing through the nematic liquid crystals 3, it is reflected by the light reflecting layer 10, and reaches the ¼ wavelength plate 80 as circularly polarized light beam 204a, which is converted into a perpendicular linearly polarized light beam 205a at the ¼ wavelength plate 80. The perpendicular linearly polarized light beam 205a cannot pass through the polarizing plate 70, so that a black display is produced.

Figure 2:
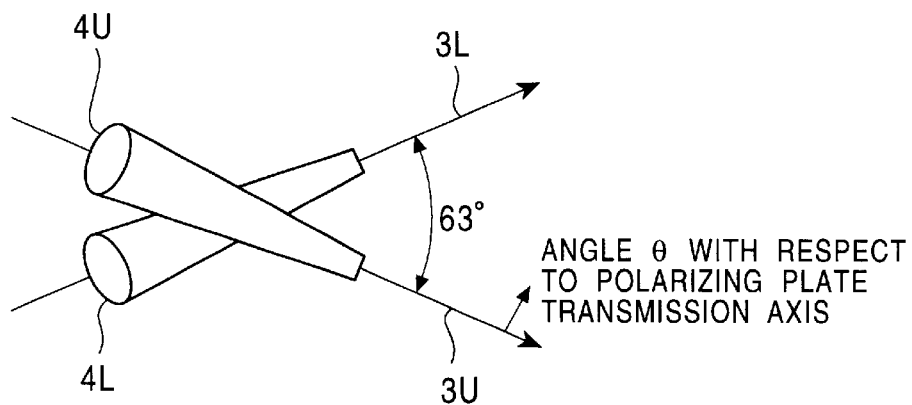
FIG. 2 is a schematic view of the orientation of nematic liquid crystal molecules used in the reflection type liquid crystal display device in accordance with the present invention.

FIG. 2 is a plan view schematically showing the relationship between the direction of orientation of a liquid crystal molecule (or a light-incoming side liquid crystal molecule) 4U disposed at the light-incoming side first substrate and the direction of orientation of a liquid crystal molecule (or a reflection side liquid crystal molecule) 4L disposed at the reflection side second substrate. As shown in FIG. 2, the direction of orientation 3U of the liquid crystal molecule 4U at the light-incoming side is set at an angle of, for example, 63 degrees from the direction of orientation 3L of the liquid crystal molecule 4L at the reflection side. In other words, the twisted angle in the nematic liquid crystals is 63 degrees. The angle between the transmission axis 70P (shown in FIG. 1) of the polarizing plate 70 and the direction of orientation 3U of the liquid crystal molecule 4U at the light-incoming side is defined as θ.

Figure 3:
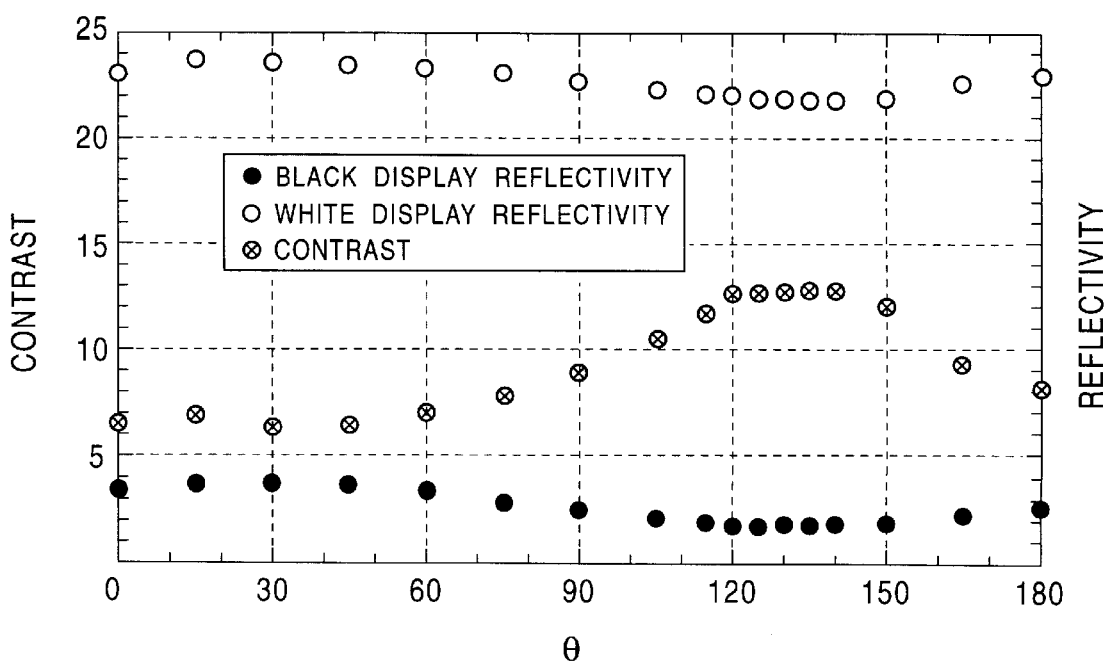
FIG. 3 is a graph illustrating the optical characteristics of the reflection type liquid crystal display device in accordance with the present invention.

FIG. 3 is a graph illustrating the optical characteristics of the reflection type liquid crystal display device of FIG. 1. The horizontal axis of the graph represents θ defined in FIG. 2. The right vertical axis represents the reflectivity, while the left vertical axis represents contrast. The reflectivity when the display is white (white display reflectivity) is indicated by a white circle, whereas the reflectivity when the display is black (black display reflectivity) is indicated by a black circle. The contrast is defined as the ratio between the white display reflectivity and the black display reflectivity.

Looking at the white display reflectivity, θ is a maximum at about 30 degrees. This shows that phase lead and phase lag are compensated the most at the wavelengths of the incident light. In other words, the polarization conversion efficiency of the nematic crystals becomes a maximum when θ=about 30 degrees. On the other hand, looking at the black display reflectivity, the liquid crystal molecules do not become vertical, so that there is still retardation, causing the black display reflectivity to be high when θ=about 30 degrees. This significantly reduces contrast to about 5. To overcome this problem, θ can be set in the range of from 120 degrees to 150 degrees at which phase lead and phase lag are compensated the least. When θ is set in this range, the black display reflectivity can be made very small without greatly reducing the white display reflectivity. This increases the contrast to about 13, which is about 2.2 times that obtained when θ=about 30 degrees.

Figure 4:
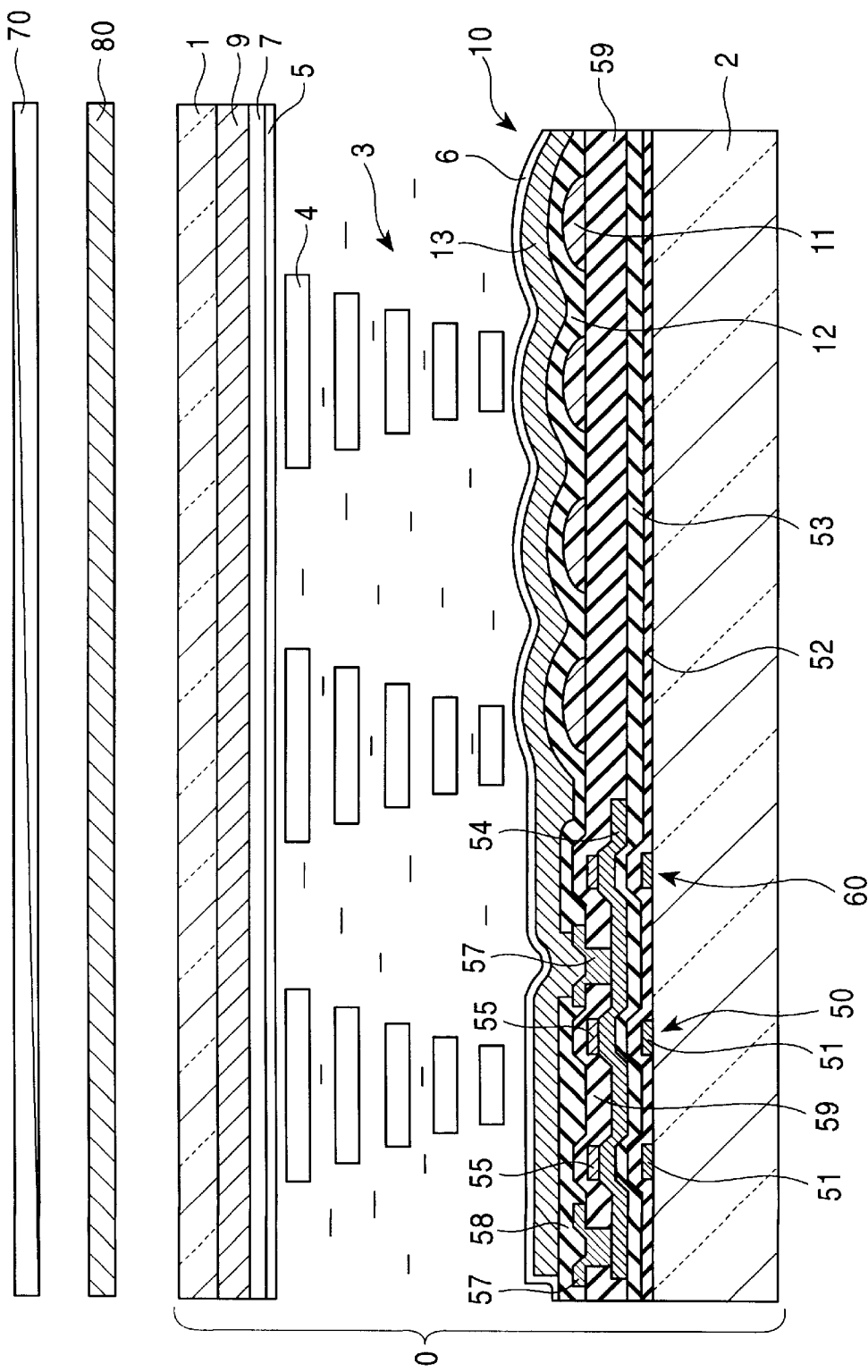
FIG. 4 is a partial sectional view of an embodiment of the reflection type liquid crystal display device in accordance with the present invention.
Figure 5:
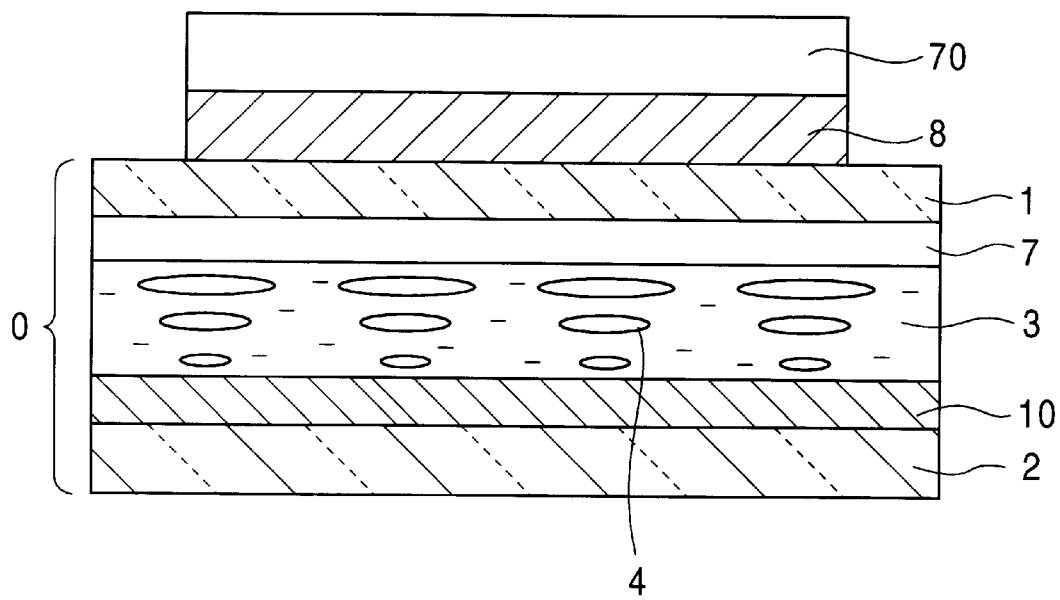
FIG. 5 is a sectional view of a conventional liquid crystal display device.
Figure 6:
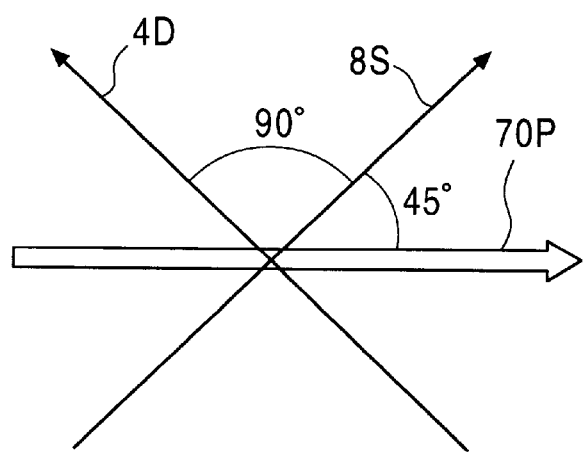
FIG. 6 is a schematic view illustrating the optical structure of the conventional liquid crystal display device.

FIG. 4 is a partial sectional view illustrating in detail a reflection type display device in accordance with the present invention. As mentioned earlier, the reflection type liquid crystal display device of the present invention employs a TN-ECB (twisted nematic-electrically controlled birefringence) mode type liquid crystal panel 0. In the reflection type liquid crystal display device illustrated in FIG. 4, a polarizing plate 70 and a ¼ wavelength plate 80 are disposed on a surface of the panel 0. The panel 0 is formed by putting together a first substrate 1 and a second substrate 2 so that they are separated by a predetermined distance and oppose each other. The first substrate 1 is formed of, for example, a transparent plate, and is disposed at the external light incoming side. Nematic liquid crystals 3 are kept in the gap between the substrates 1 and 2. The liquid crystal molecules 4 thereof are twisted in accordance with the present invention by upper and lower alignment films 5 and 6 formed of, for example, polyimide. An electrode is formed on the inside surface of each of the substrates 1 and 2, and a voltage is applied to the nematic liquid crystals 3 with each pixel. In the embodiment, the active matrix type is used, in which an electrode 7 (formed of ITO or the like) is formed at the first substrate 1 side and a pixel electrode 13 (formed of silver or the like) is formed at the second substrate 2 side. The pixel electrode 13 is driven by a switching element comprising, for example, a poly-Si thin film transistor 50. The electrode 7 and the pixel electrode 13 face each other, with pixels being controlled therebetween. A light reflecting layer 10 is formed at the inside surface of the second substrate 2 at the reflection side. The light reflecting layer 10 is formed by laminating a resinous film 11, formed of photoresist or the like, and the pixel electrode (or metallic film) 13, formed of silver or the like. The reflection type liquid crystal display device with this structure is a TN-ECB, normally white mode type of liquid crystal display device. More specifically, in this type of liquid crystal device, when a voltage is not applied, the nematic liquid crystals 3 act together as a ¼ wavelength layer as a result of the twisted orientation of the molecules being maintained, so that the nematic liquid crystals 3 cooperate with the polarizing plate 70 and the ¼ wavelength plate 80 in order to pass external light, whereby a white display is produced. On the other hand, when a voltage is applied, the orientation of the molecules of the nematic liquid crystals 3 is changed to a substantially vertical orientation, so that the nematic liquid crystals 3 lose their ability to act together as a ¼ wavelength layer. Therefore, the nematic liquid crystals 3 cooperate with the polarizing plate 70 and the ¼ wavelength plate 80 to block external light, whereby a black display is produced.

A description will now be given of the component parts thereof, still with reference to FIG. 4. The ¼ wavelength plate 80 is interposed between the polarizing plate 70 and the first substrate 1. The ¼ wavelength plate 80 is a wideband type plate. It is formed by laminating a 270 nm thick phase film, with a stretch axial direction separated by about 72.5 degrees from the transmission axis direction of the polarizing plate 70, and a 140 nm thick phase film, with a stretch axial direction separated by about 10 degrees from the transmission axis direction of the polarizing plate 70. In the ¼ wavelength plate 80, the wavelength distribution characteristics are such that there is a slight peak at the green wavelength region and the retardation is extremely small at the blue and red wavelength regions. The ¼ wavelength plate 80 provides a phase difference of ¼ wavelength between ordinary light and extraordinary light. When external light passes through the polarizing plate 70, it is converted into linearly polarized light beams. When the converted linearly polarized light beams pass through the ¼ wavelength plate 80, they are converted into circularly polarized light beams, which pass once again through the ¼ wavelength plate in order to be converted into linearly polarized light beams. Here, the direction of polarization is rotated 90 degrees from the original direction of polarization. Accordingly, by using the ¼ wavelength plate in combination with the polarizing plate, the direction of polarization can be rotated. This capability of rotating the direction of polarization can be used for displaying information and images.

In the panel 0, the nematic liquid crystal 3 composed of nematic liquid crystal molecules 4 essentially oriented horizontally and having a positive dielectric anisotropy is used as an electro-optic layer. When the nematic liquid crystals 3 are formed to a suitable thickness, they act together as a ¼ wavelength layer. In the embodiment, the nematic liquid crystals 3 have an anisotropy of refractive index Δn in the order of, for example, 0.7, and a thickness in the order of, for example, 3 μm. Therefore, the retardation in the nematic liquid crystals 3 is Δn·d=0.2 to 0.25 μm. As shown in FIG. 4, when the nematic liquid crystal molecules 4 have a twisted orientation, the aforementioned retardation value essentially becomes approximately 0.15 μm (150 nm), which is about ¼ of the center wavelength (about 60 nm) of the external light, making it possible for the nematic liquid crystals 3 to act together optically as a ¼ wavelength plate. When the nematic liquid crystals 3 are sandwiched between the upper and lower alignment films 5 and 6, the desired twisted orientation can be obtained. At the first substrate 1 side, the liquid crystal molecules 4 line up along a rubbing direction of the alignment film 5. At the second substrate 2 side, the liquid crystal molecules 4 line up along a rubbing direction of the alignment film 6. In the present invention, the rubbing direction of the alignment film 5 is set at an angle of from 120 to 150 degrees from the transmission axis of the polarizing plate 70. When the rubbing direction of the upper and lower alignment films 5 and 6 is shifted by an angle of from 60 to 70 degrees, the desired twisted orientation can be obtained.

A color filter 9 is formed adjacent to the transparent first substrate 1. It is formed of, for example, a photoresist which contains dispersed pigments. A light reflecting layer 10 is formed adjacent to the second substrate 2 opposing the first substrate 1. The light reflecting layer 10 is bumpy and is capable of scattering light. Therefore, the light reflecting portion appears paper white from the outside, so that it provides a fine display background. In addition, since it reflects light incident thereupon at a relatively wide range of angles, the field of view angle increases, which makes the display easy to see and bright in a wide range of field of view angles. As shown in FIG. 4, the light reflecting layer 10 comprises resinous films 11, formed into bumps, and a metallic film 13 deposited onto the surface of the resinous films 11. As mentioned earlier, the metallic film 13 serves as a pixel electrode. The light reflecting layer 10 is formed by subjecting the square-columnar or circular-columnar resin films 11 (previously formed by patterning so that they are separated from one another) to reflow so that smooth bumps are formed. If there are any gaps left after the reflowing, more resinous film 12 may be used and embedded therein in order to form smooth bumps. The surfaces of the bumps may be inclined at an angle of, for example, approximately 10 to 20 degrees.

A thin film transistor 50, for driving the pixel electrode, is formed on a surface of the second substrate 2 in an integrated fashion. It has a bottom gate structure, which is a laminated structure of, from the bottom up, gate electrodes 51 (formed of, for example, Ma), two gate insulating layers 52 and 53 (formed of, for example, $SiO_2$ and $SiN_x$), and a semiconductor thin film 54 (formed of, for example, polycrystalline silicon). It is also a double gate structure, since it comprises two gate electrodes 51. Channel areas are provided in the semiconductor thin film 54 area located directly above the gate electrodes 51. Each channel area is protected by a stopper 55 formed of $SiO_2$ or the like. An auxiliary capacitor portion 60 with the same layer structure as the thin film transistor 50 is also formed. The auxiliary capacitor portion 60 and the thin film transistor 50 having the above-described structure are covered by an interlayer insulting film 59 formed of, for example, $SiO_2$. A contact hole, which forms a connecting passage with respect to the drain area and the source area of the thin film transistor, is formed in the interlayer insulating film 59. Wirings 57, formed of Al or the like, are formed above the interlayer insulating film 59 so as to be connected with the drain area and the source area of the thin film transistor 50 through the contact hole. The wirings 57 are covered with interlayer insulating film 58. The aforementioned pixel electrode is formed above the wirings 57 by patterning. The pixel electrode is electrically connected to the drain area of the thin film transistor 50 through the wirings 57.

As can be understood from the foregoing description, according to the TN-ECB, normally white mode, reflection type liquid crystal display device of the present invention, the direction of the transmission axis of the polarizing plate is disposed at an angle of from 120 to 150 degrees from the direction of orientation of the liquid crystals at the side of the substrate disposed at the light-incoming side, so that the black display reflectivity can be reduced almost without reducing the white display reflectivity, thereby increasing contrast to about 2.2 times that obtained in conventional liquid crystal display devices.

What is claimed is:

1. A reflection type liquid crystal display device, comprising:
   a panel comprising a transparent first substrate disposed at an external light incoming side; a second substrate opposing the first substrate, with the first substrate and the second substrate being put together so as to be separated by a predetermined distance; nematic liquid crystal kept in the gap, with the molecules thereof having a twisted orientation; and an electrode, formed at the first substrate and at the second substrate, for applying a voltage to the nematic liquid crystal;
   a polarizing plate disposed at the first substrate side; and
   a ¼ wavelength plate disposed at the first substrate side;
   wherein when a voltage is applied, the orientation of the molecules of the nematic liquid crystal is changed to a substantially vertical orientation, and the nematic liquid crystal loses the ability to act as a ¼ wavelength layer, so that the nematic liquid crystal cooperates with the polarizing plate and the ¼ wavelength plate for blocking external light in order to generate a black display; and
   wherein the direction of a transmission axis of the polarizing plate is set at an angle of from 120 to 150 degrees in a clockwise direction from the direction of orientation of the portion of the nematic liquid crystal disposed at the first substrate side.

2. A reflection type liquid crystal display device according to claim 1, wherein the ¼ wavelength plate is a laminated structure of at least two phase films with different stretch axial directions, the ¼ wavelength plate having substantially flat optical characteristics in the visible wavelength region.

3. A reflection type liquid crystal display device according to claim 1, wherein the direction of orientation of the portion of the nematic liquid crystal at the second substrate side is separated from the direction of orientation of the portion of the nematic liquid crystal at the first substrate side by an angle of from 60 to 70 degrees.

* * * * *